(12) United States Patent
Bezold et al.

(10) Patent No.: US 11,460,122 B2
(45) Date of Patent: Oct. 4, 2022

(54) SOLENOID VALVE, ASSEMBLY AND METHOD OF REPLACING A DIAPHRAGM

(71) Applicant: Bürkert Werke GmbH & Co. KG, Ingelfingen (DE)

(72) Inventors: Christian Bezold, Ingelfingen (DE); Theresa Ruck, Ingelfingen (DE)

(73) Assignee: Bürkert Werke GmbH & Co. KG, Ingelfingen (DE)

( * ) Notice: Subject to any disclaimer, the term of this patent is extended or adjusted under 35 U.S.C. 154(b) by 0 days.

(21) Appl. No.: 17/198,724

(22) Filed: Mar. 11, 2021

(65) Prior Publication Data

US 2021/0283731 A1 Sep. 16, 2021
US 2022/0241907 A2 Aug. 4, 2022

(30) Foreign Application Priority Data

Mar. 13, 2020 (DE) ...................... 10 2020 107 055.1

(51) Int. Cl.
*F16K 31/06* (2006.01)
*F16K 7/14* (2006.01)

(52) U.S. Cl.
CPC ............ *F16K 31/0672* (2013.01); *F16K 7/14* (2013.01); *F16K 31/0641* (2013.01)

(58) Field of Classification Search
CPC ............... F16K 31/105; F16K 31/0641; F16K 31/0672; F16K 7/12; F16K 7/14; B23P 6/00
See application file for complete search history.

(56) References Cited

U.S. PATENT DOCUMENTS

| 5,167,397 A | * | 12/1992 | Farnsworth | ......... F16K 31/0672 251/368 |
| 8,434,514 B2 | | 5/2013 | Bezold et al. | |
| 9,091,368 B2 | | 7/2015 | Scheibe et al. | |
| 2003/0155546 A1 | * | 8/2003 | Browne | .................. F16K 41/12 251/331 |

(Continued)

FOREIGN PATENT DOCUMENTS

| DE | 20 2009 016 447 U1 | 3/2010 |
| DE | 10 2012 007 766 A1 | 10/2013 |
| DE | 10 2014 114212 A1 | 3/2016 |

*Primary Examiner* — Umashankar Venkatesan
(74) *Attorney, Agent, or Firm* — McNees Wallace & Nurick LLC (57) ABSTRACT

A solenoid valve has a housing which comprises a first and a second housing part, wherein a flexible diaphragm is arranged between the first and the second housing part. A movably mounted actuating element is provided which is connected to the diaphragm and detaches the diaphragm from a valve seat in an operating position of the first and the second housing part upon movement into an open position, and which presses the diaphragm onto the valve seat upon movement into a closed position. The first and the second housing part can take up a service position in which the diaphragm is accessible. The diaphragm is connected with a positive fit to the actuating element in a nondestructively detachable manner such that in the service position, the diaphragm can be removed from the actuating element by releasing the positive fit and can be connected thereto by establishing a positive fit. An assembly and a method of replacing a diaphragm are furthermore proposed.

18 Claims, 8 Drawing Sheets

(56) References Cited

U.S. PATENT DOCUMENTS

| | | | |
|---|---|---|---|
| 2005/0011555 A1* | 1/2005 | Maula | F16K 31/0693 137/341 |
| 2007/0241298 A1* | 10/2007 | Herbert | F16K 37/0041 251/129.04 |
| 2009/0140194 A1* | 6/2009 | Kato | F16K 7/14 251/318 |
| 2011/0133108 A1* | 6/2011 | Bezold | F16K 11/022 251/231 |
| 2013/0168592 A1* | 7/2013 | Yan | F16K 41/103 251/331 |
| 2013/0277591 A1* | 10/2013 | Scheibe | F16K 31/10 251/279 |
| 2013/0341550 A1* | 12/2013 | Fukano | F16K 31/1221 251/331 |
| 2016/0091099 A1* | 3/2016 | Scheibe | F16K 11/022 137/625.48 |

\* cited by examiner

SOLENOID VALVE, ASSEMBLY AND METHOD OF REPLACING A DIAPHRAGM

FIELD OF THE INVENTION

The invention relates to a solenoid valve, in particular to a diaphragm valve by means of which a fluid flow can be controlled, to an assembly, and to a method of replacing a diaphragm.

BACKGROUND

Diaphragm valves have the advantage that due to the diaphragm, it is easily possible to divide fluid-carrying areas of the housing thereof off from an electromagnetic drive, such that the drive and in particular a magnet coil do not come into contact with the fluid.

In a known design, the diaphragm is clamped between two housing parts, while the surface of the diaphragm is movable. With regard to the solidity and thickness of the diaphragm, a compromise is often made to obtain, on the one hand, a high movability of the diaphragm, and, on the other hand, a sufficient stability and a long service life.

The object of the invention is to increase the service life of a solenoid valve having a diaphragm.

SUMMARY

The invention provides a solenoid valve having a housing which comprises a first and a second housing part, wherein a flexible diaphragm is arranged between the first and the second housing part. At least one fluid duct having a valve seat adapted to be closed by the diaphragm is formed in the first housing part, and a movably mounted actuating element is received in the second housing part, which is connected to the diaphragm and detaches the diaphragm from the valve seat in an operating position of the first and the second housing part upon movement into an open position, and which presses the diaphragm onto the valve seat upon movement into a closed position. The housing is formed such that the first and the second housing part can take up a service position in which the first and the second housing part are spaced apart from each other and in which the diaphragm is accessible, wherein the diaphragm is connected to the actuating element in a nondestructively detachable manner and the diaphragm and the actuating element are formed such that in the service position, the diaphragm can be removed from the actuating element and be connected thereto.

This design allows the diaphragm to be easily replaced, so that the diaphragm can be designed as a wearing part. It is thus possible to configure the diaphragm for high movability, for example, and to accept a shortened diaphragm service life. If the diaphragm is worn, it can easily and cost-effectively be replaced with a new diaphragm, and the solenoid valve can continue to be used. The service life of the solenoid valve is therefore no longer limited by the service life of the diaphragm.

This is also favorable, for example, for use of the solenoid valve in food production, such as in hot beverage vending machines.

In particular, the diaphragm can be replaced without tools. This means that the opening of the housing can also take place without tools, just as the replacement of the diaphragm. In this way, the replacement times can be kept short, which reduces the costs of maintenance works, for example. Replacing only the diaphragm, but not the entire drive of the valve, of course further reduces costs.

In particular, the diaphragm can be detached from the actuating element in a non-destructive manner and without tools. This is unusual as the mechanical connection must transmit high forces when the valve is switched during operation. However, the use of a tool always carries the risk of slight damage to the actuating element or the diaphragm. Furthermore, removal of the diaphragm using a tool could also result in a tearing of the diaphragm or in a rupture of the diaphragm, so that small fragments of the diaphragm would still be present at the fastening point. This makes the removal of these fragments even more difficult and increases the risk of a misalignment of or damage to the actuating element.

The diaphragm is fastened to the actuating element in particular via a latching connection, i.e. the part of the latching connection which is located on the actuating element is reused.

As in known solenoid valves, the diaphragm advantageously separates the fluid-carrying parts of the solenoid valve from a drive side. A control space which can be filled with fluid is formed between an inner side of the first housing part and the diaphragm, while the actuating element is arranged on the side of the diaphragm facing away from the control space.

As is usual for solenoid valves, the drive is an electromagnetic drive. For example, a plunger is provided which is moved by a magnetic coil of the drive and is coupled to the actuating element such that it moves the latter back and forth between the open position and the closed position.

The actuating element is preferably designed as a rocker having two arms, the drive acting on one of the arms offset from the pivot axis of the rocker.

In this case, by pivoting the actuating element, one of the arms is alternately raised and the other lowered, as a result of which an open position and a closed position of a valve seat assigned to one of the arms can be defined.

Preferably, the diaphragm is substantially flat such that it can be clamped between the two housing parts at the peripheral edge thereof, and can thus be circumferentially fixed in a fluid-tight manner. This arrangement also contributes to the fact that the diaphragm can be designed as an easily replaceable wearing part.

While the service position of the housing is defined such that the interior of the housing in which the diaphragm is arranged is accessible, the operating position describes the assembled state of the housing in which the normal working mode of the solenoid valve, i.e. the supply of fluid, is possible and in which the interior of the housing is enclosed by the two housing parts and thus the diaphragm is not accessible from the outside.

For a simple fastening of the diaphragm, at least one connecting section may be provided on the actuating element, which has a first fastening structure which is adapted to be connected with a positive fit to a complementary second fastening structure on the diaphragm.

Preferably, at least one connecting section is provided on the actuating element symmetrically to the pivot axis of the rocker on both arms, such that the diaphragm can be connected to the actuating element at several points.

The connecting section may be an integral part of the actuating element, but could also be designed as a separate component which is permanently and firmly connected to the actuating element. However, in any case, it is advantageous if the first fastening structure is rigid and not elastically deformable.

Preferably, the second fastening structure on the diaphragm is made of the material of the diaphragm itself and is thus usually elastically deformable. Advantageously, the second fastening structure is integrally formed with the diaphragm already during manufacture thereof.

For example, an ethylene-propylene-diene rubber (EPDM) can be used as the material for the diaphragm.

In particular, an elastic fastening structure on the diaphragm can be combined with a rigid fastening structure (in particular a latching structure) on the actuating element, which makes it easier to establish and detach the positive fit. In this way, the diaphragm with the second fastening structure thereof can be fixed to the first fastening structure of the actuating element under elastic deformation.

It has been found that a positive connection can provide a sufficient holding force to hold the diaphragm securely on the actuating element in the operating position, while at the same time the positive fit allows the diaphragm to be detached from the actuating element with little effort if it needs to be replaced.

The diaphragm should be adapted to be detached from the actuating element in one piece so that replacement can be carried out quickly without having to remove residues of the old diaphragm from the actuating element.

For example, one of the fastening structures is formed as a protrusion and the other fastening structure is formed as a receptacle complementary to the protrusion.

The positive fit can be improved by providing both fastening structures with complementary undercuts which engage each other when the diaphragm is mounted on the actuating element.

In a preferred variant, the receptacle is formed on the diaphragm. It can be designed, for example, as a hollow cylinder projecting from the surface of the diaphragm in the direction of the actuating element.

Here, for example, an undercut in the form of an annular, circumferentially surrounding, radially inwardly directed projection on the hollow cylinder is conceivable. Complementary thereto, the actuating element may have a protrusion having an undercut in the form of an annular groove. In this way, the diaphragm can be "buttoned", i.e. latched with a positive fit onto the actuating element.

The protrusion may in particular be mushroom-shaped with a circular cross-section.

The projection may completely fill the annular groove.

It has been found that the desired withdrawal forces to separate the diaphragm from the actuating element can be adjusted, among other things, by the mass and volume of the diaphragm material in the projection. The depth and radii of the annular groove also play a role, so that in general, the geometry of the annular groove and projection can be adjusted by a skilled person to determine the forces required to detach and also to connect the diaphragm.

To facilitate the buttoning of the diaphragm without tools, i.e. only with manual force, in case of a high holding force, an insertion bevel is for example formed at the free end of the receptacle, which facilitates the insertion of the protrusion by reducing the insertion force at the beginning of the buttoning of the diaphragm.

Furthermore, the undercut should be defined by a cone starting from the thickening, a directly adjoining radius at the narrowest point of the undercut in terms of radius, and a directly adjoining mating cone, which optimizes the movement of the diaphragm to the actuating element when the diaphragm is put on and detached.

In particular, the projection has a thickening which is provided with a radius and which constitutes a peripheral edge from which the cone tangentially originates and forms the annular groove. The smallest point in diameter of the rotationally symmetrical annular groove is also provided with a larger radius, which then merges into the mating cone.

The cone and the mating cone may have different cone angles, the angle of the cone being in particular smaller than that of the mating cone, which makes it easier to withdraw the diaphragm.

The radius in the thinnest point of the undercut in cross-section should be larger (preferably by at least a factor of 1.2) than the radius defining the thickening.

The ratio of the volume of the undercut to the volume of the thickening at the free end of the projection should be in the range of 1 to 1.6, in particular 1.2 to 1.4, as has been shown by extensive testing. This optimizes the stability of the support, which can be expressed using this ratio, while still realizing non-destructive detachability.

During normal operation, when the housing parts are in the operating position and the solenoid valve performs its normal function, there is a firm connection between the diaphragm and the actuating element. The connection between the fastening structures should be designed so that a force required to detach the diaphragm from the actuating element is significantly greater than the forces which occur during normal operation and act on the connection of the two fastening structures.

The fastening structures can also be used to press the diaphragm onto the valve seat, which is why it is convenient to arrange at least one fastening structure in the area of the valve seat. Preferably, the second fastening structure on the diaphragm is even aligned concentrically with the associated valve seat when the valve seat is closed.

The first fastening structure on the actuating element can form a rigid contact surface for force transmission and support of the diaphragm on the valve seat. For this purpose, it is advantageous if this contact surface forms approximately the same or a slightly larger surface as the valve seat.

In a preferred variant, the contact surface is inclined at the maximum pivot angle of the rocker formed by the actuating element, so that a uniform application force acts on the entire surface of the valve seat when the actuating element is in the closed position with respect to this valve seat. This angle can be up to about 4°, in particular up to about 3°.

It would also be conceivable to provide further elements in the area of the fastening structures to increase the contact surface, for example an additional ring extending around the protrusion on the actuating element.

In one possible embodiment, in order to be able to easily move the housing from the operating position to the service position and back, the first and second housing parts are connected on one side of the housing via a hinge, wherein the first and/or the second housing part are pivoted about the hinge upon movement to the service position. In this way, the housing can be easily opened from the operating position to the service position by pivoting one or both housing parts.

The hinge can be formed, for example, such that hinge elements are provided on both housing parts, which are in particular connected by an inserted pin forming a hinge axis, or pivotably engage one another.

The diaphragm is usually arranged in a parting plane between the housing parts when the housing is in the operating position.

Preferably, a locking mechanism is provided which in particular comprises at least one locking component cooperating with a bar structure on the first and/or on the second housing part, the locking mechanism preventing in a locked position the housing from being movable into the service position, thus securing the two housing parts together in the operating position.

The locking component can be, for example, a rigid clamp designed such that it can be slid parallel to flat lateral edges of the housing parts which lie on top of each other in the operating position and over these flat lateral edges, thus holding the housing parts together with a positive fit. The lateral edges form the bar structures. If the diaphragm is to be replaced, the locking component is withdrawn from the housing parts, and these can be moved apart and brought into the service position. Withdrawal and putting on the clamp can be carried out without tools, if necessary, by hand force only.

In a further embodiment, the locking mechanism is a clamp mechanism. It comprises, for example, a pivotable clip which is fixed to one of the housing parts and which engages a contact surface on the other housing part. The clip corresponds to the locking component, while the contact surface forms the bar structure. Preferably, the clamp mechanism can be operated without tools.

The clamp mechanism can be designed in the manner of a known clip closure. In this way, the housing can be easily opened by hand without tools into the service position to replace the diaphragm.

Such a clamp mechanism can be combined with a hinge on the opposite side of the housing.

It is also possible to provide a clamp mechanism having two pivoting clips and arrange them on opposite narrow sides of the housing. In this case, no hinge is provided.

The solenoid valve may in particular be designed as a 3/2-way valve or as a 2/2-way valve. In the first case, two valve seats are preferably provided adjacent to each other along a longitudinal direction of the actuating element and are associated with the two arms of the rocker of the actuating element and are alternately opened and closed when the actuating element is moved by the drive. In this case, the open position and the closed position are each defined separately for the individual valve seats, the closed position of the actuating element for one valve seat always correlating with the open position for the other valve seat.

In particular, when designed as a 3/2-way valve, two connecting sections are preferably provided, each with a first fastening structure on the actuating element cooperating with two second fastening structures on the diaphragm.

Among other things, the actuating element in this case is preferably a rocker which is connected to the diaphragm at each of the two arms thereof.

The maximum stroke of the diaphragm from the valve seat possible with the valve can be, for example, 0.3 to 2.0 mm, in particular 0.5 to 1.0 mm.

The aforementioned object is also achieved by an assembly composed of a solenoid valve, as described above, and a diaphragm which can be connected with a positive fit to the actuating element. The diaphragm can be replaced one or several times in the course of the service life of the solenoid valve, so that if the diaphragm wears out, the solenoid valve can continue to be used by replacing the old diaphragm with a new diaphragm.

The invention further relates to a method of replacing a diaphragm of a solenoid valve as described above, comprising the following steps:

the housing parts are moved from the operating position into the service position, the diaphragm mounted on the actuating element is removed from the actuating element in that a positive fit between the diaphragm and the actuating element is released, a new diaphragm to be mounted is fixed to the actuating element in that a positive fit is produced between the diaphragm and the actuating element, and the housing parts are moved from the service position back to the operating position.

Preferably, no further fastening steps are necessary, such that a replacement of the diaphragm can be carried out in a simple manner and in particular without tools.

DETAILED DESCRIPTION

The figures show a solenoid valve 10 in the form of a diaphragm valve which is configured as a 3/2-way valve.

Figure 6:
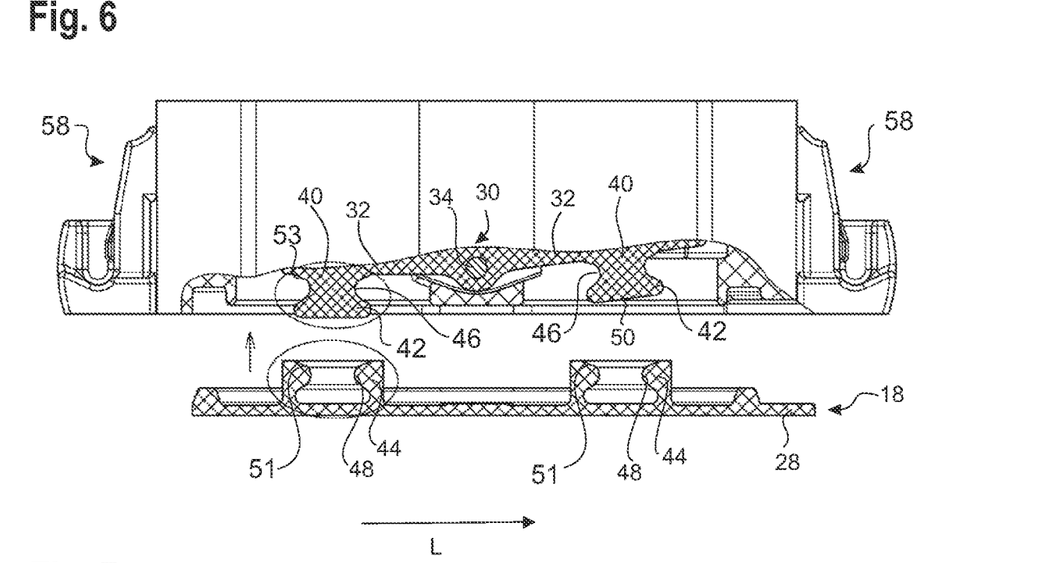
FIGS. 6 to 8 show details of the diaphragm and of the actuating element.
Figures 7, 8:
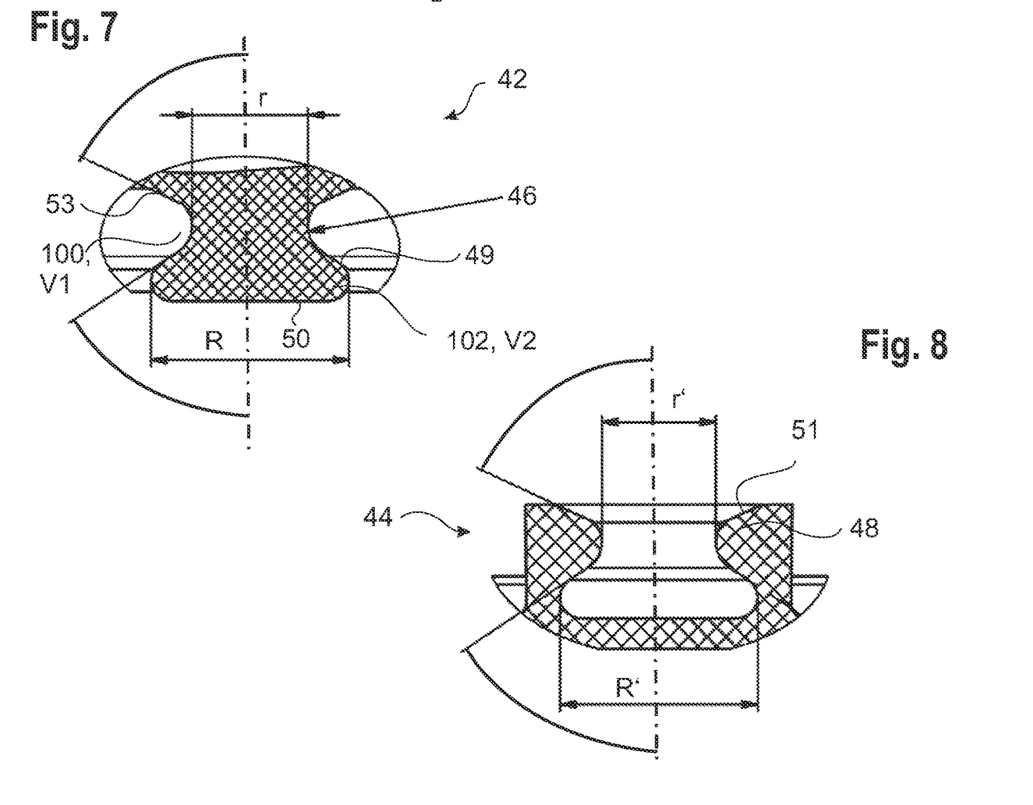

FIGS. 1 to 5 show a first embodiment, and FIGS. 6 to 8 show a second embodiment.

A housing 12 of the solenoid valve 10 comprises a first housing part 14 and a second housing part 16 which together can enclose an interior space, a diaphragm 18 being arranged in a parting plane E (see FIG. 1) between the two housing parts 14, 16.

The diaphragm 18 separates a fluid-carrying control space 20 from a driving side on which a drive 22 is provided. The diaphragm 18 prevents the driving side from coming into contact with the fluid in the control space 20.

The first housing part 14 includes a plurality of fluid ducts 24, in this case three fluid ducts. The two outer fluid ducts 24 are here each connected to a valve seat 26 opening into the control space 20.

The diaphragm 18 also performs the function of alternately closing and releasing one of the valve seats 26 to supply fluid through the solenoid valve 10. In this case, the center fluid channel 24 is not assigned to any valve seat and serves as an feed line or discharge line for a conveyed fluid.

Figure 1:
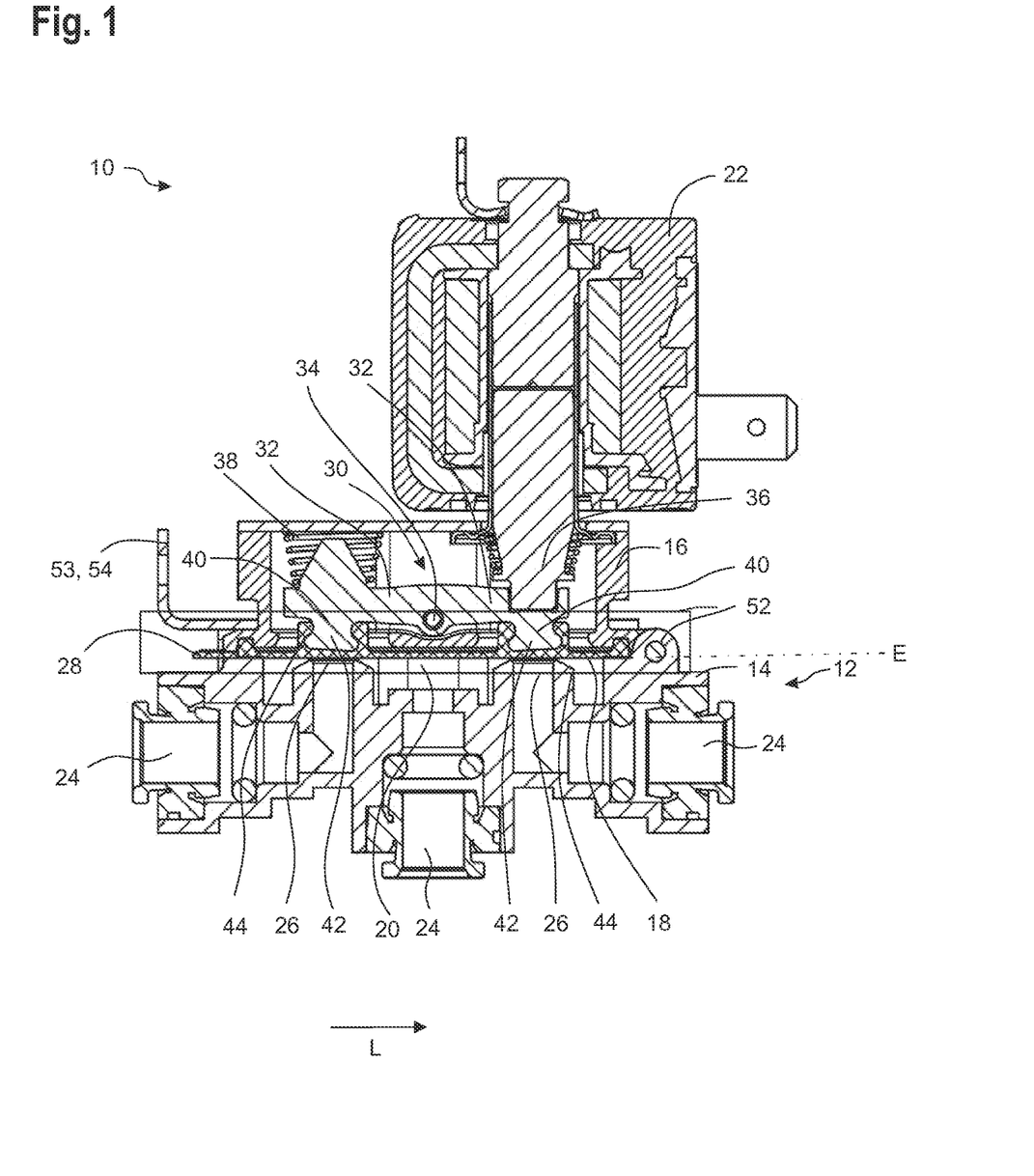
FIG. 1 shows a solenoid valve according to the invention in a first embodiment in a schematic sectional view in an operating position.

FIG. 1 shows the solenoid valve 10 in normal operation, the housing parts 14, 16 being in an operating position in which the two housing parts 14, 16 lie on top of each other so as to confine the diaphragm 18 in an interior space. In the operating position, a peripheral edge 28 of the diaphragm 18 is clamped between the housing parts 14, 16. The diaphragm 18 is not accessible from the outside.

Figure 3:
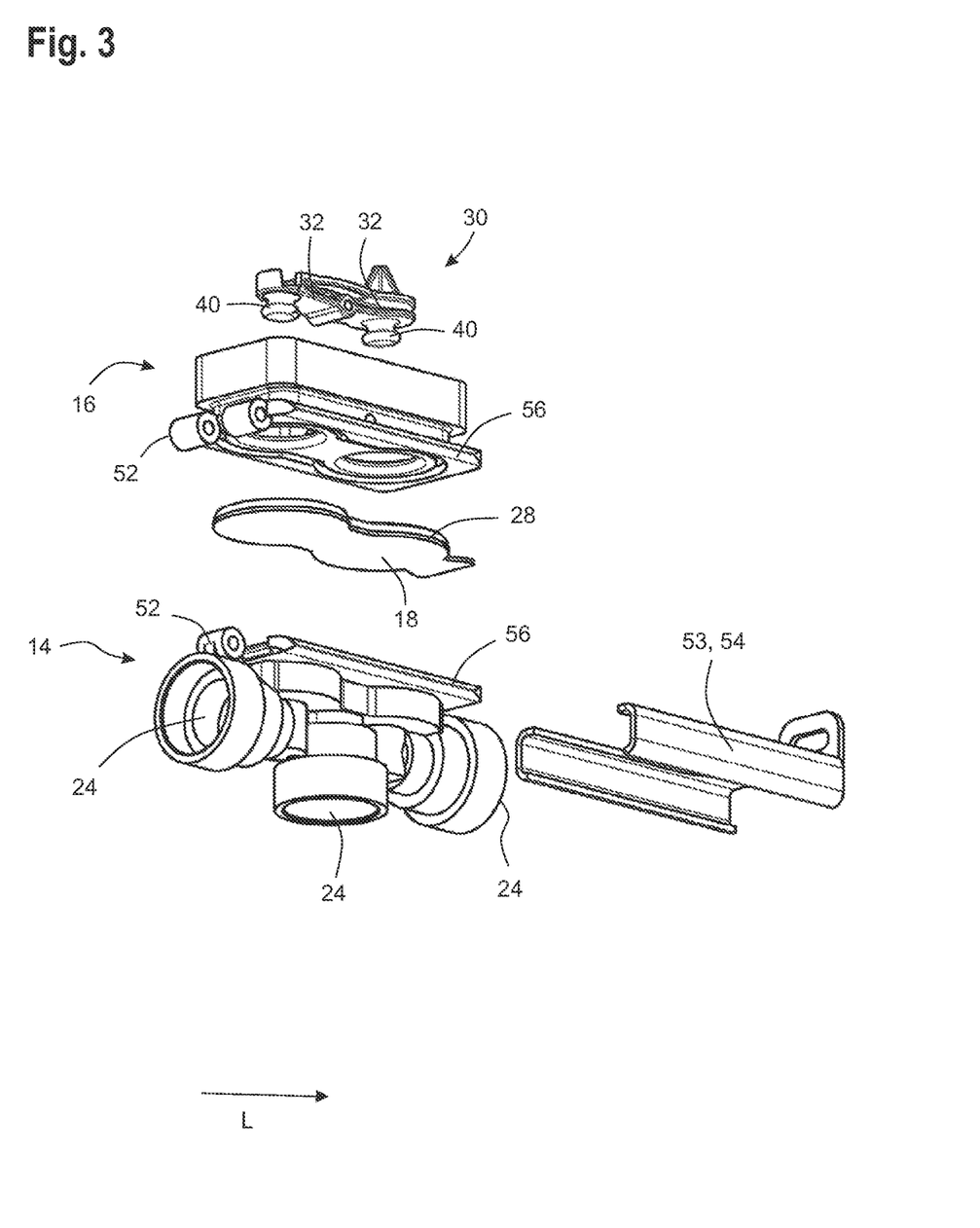
FIG. 3 shows components of the solenoid valve of FIG. 1 in an exploded view.

A movably mounted actuating element 30, which is configured here as a rocker having two arms 32 that can be pivoted about an axis 34, is arranged in the second housing part 16 (see also FIG. 3). In the area of the axis 34, the actuating element 30 is pivotably mounted in the second housing part 16.

The drive 22 acts on one of the arms 32 (the right arm in FIG. 2) via a plunger 36, so that the actuating element 30 can be pivoted between two positions by the drive 22. The diaphragm 18 is respectively pressed onto one of the valve seats 26, which corresponds to a closed position with respect to this valve seat 26, and lifted off the other valve seat 26, which corresponds to an open position of this valve seat 26.

To reset the actuating element 30, it is biased by a return spring 38 which acts on the arm 32 of the actuating element 30 on which the plunger 36 of the drive 22 does not act, here the left arm 32.

The diaphragm 18 is fixed with a positive fit to the actuating element 30.

For this purpose, two rigid connecting sections 40 are provided on the actuating element 30, which each terminate in a first rigid fastening structure 42. The connecting sections 40 and the first fastening structures 42 are here formed in one piece with the actuating element 30.

The fastening structure 42 is here mushroom-shaped with a circular cross-section over the entire length.

Two second fastening structures 44 are provided on the diaphragm 18, the shape of which is complementary to the first fastening structures 42 such that the fastening structures 42, 44 can engage each other with a positive fit.

Here, the second fastening structures 44 project from the surface of the diaphragm 18 and are integrally formed with the diaphragm 18 in this example. The second fastening structures 44 are therefore made of the same material as the diaphragm 18 and are thus elastically deformable.

In the embodiment shown here, the first fastening structures 42 are formed on the actuating element 30 as protrusions having rounded, thickened free ends, and the second fastening structures 44 are formed on the diaphragm 18 as hollow-cylindrical receptacles.

Here, the positive fit (see FIG. 4) between the first fastening structures 42 and the second fastening structures 44 is further enhanced in that each of the fastening structures 42, 44 has an undercut 100 (see also FIGS. 7 and 8). The undercut 100 is formed as a peripheral annular groove 46 between the free end of the protrusion and the plate-shaped rest of the actuating element 30 in the case of the first fastening structure 42 and as a peripheral projection 48 in the case of the second fastening structure 44. When the diaphragm 18 is mounted on the actuating element 30, the projection 48 engages into the annular groove 46 and thus securely and firmly holds the diaphragm 18 in contact with the actuating element 30 under the forces occurring during normal operation in the operating position when supplying fluid.

The radial depth of the annular groove 46 should be chosen as large as possible, whereas the radius 49 at the transition from the free end of the protrusion into the annular groove 46 should be chosen as small as possible to be able to form a corresponding projection 48 having a large radial depth and a largest possible mass. However, the radius 49 is in particular always chosen large enough such that a detaching of the diaphragm 18 remains possible.

The undercut 100 of the protrusion (see FIG. 7) has a volume V1 which, in relation to the volume V2 of the radially protruding free end of the protrusion, as measured from the narrowest point (see radius r) of the undercut 100, is in the range of 1 to 1.4. To determine the volume V2, a fictitious cylinder having a radius r is taken which mentally separates the downward and radially outwardly projecting thickening 102 of the protrusion. The volume V1 is obtained as the volume of the undercut 100 relative to a fictitious cylinder of radius R, i.e. the radius at the thickest point of the protruding material 102 at the free end of the protrusion. This feature is expressly not limited to the variant shown having the previously indicated angles, but applies generally to all possible variants of the present invention.

The radii r' and R' of the receptacle (see FIG. 8) are minimally smaller than the associated radii r and R, respectively, to realize a light press fit.

An angle β between the transition of the annular groove 46 into the free end (thickening) and a central axis of the protrusion is therefore always significantly smaller than 90°, in particular smaller than 60° (see also FIGS. 7 and 8). This angle forms a cone tangentially adjoining the radius 49.

In the example shown in FIGS. 6 to 8, the edge of the receptacle has an insertion bevel 51 which facilitates insertion of the rounded or beveled free end of the protrusion into the receptacle, since the open end of the receptacle can slightly widen, thus reducing the necessary insertion force.

An angle γ enclosed by the insertion bevel 51 along with the longitudinal axis of the receptacle is, for example, about 60° to 70° and is usually larger than the angle β. This angle forms the mating cone which tangentially adjoins the radius in the annular groove 26.

Figure 4:
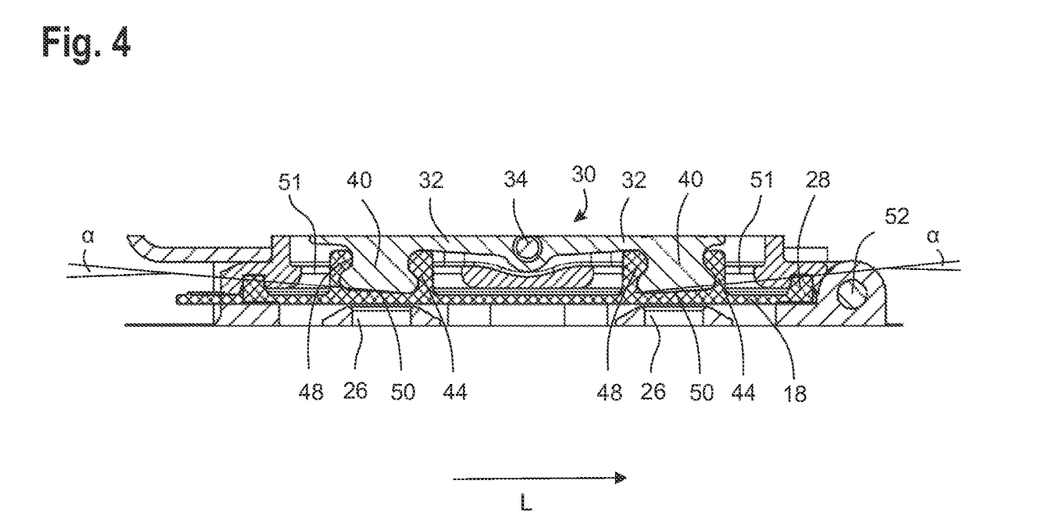
FIG. 4 shows an enlarged detail of FIG. 1.
Figure 5:
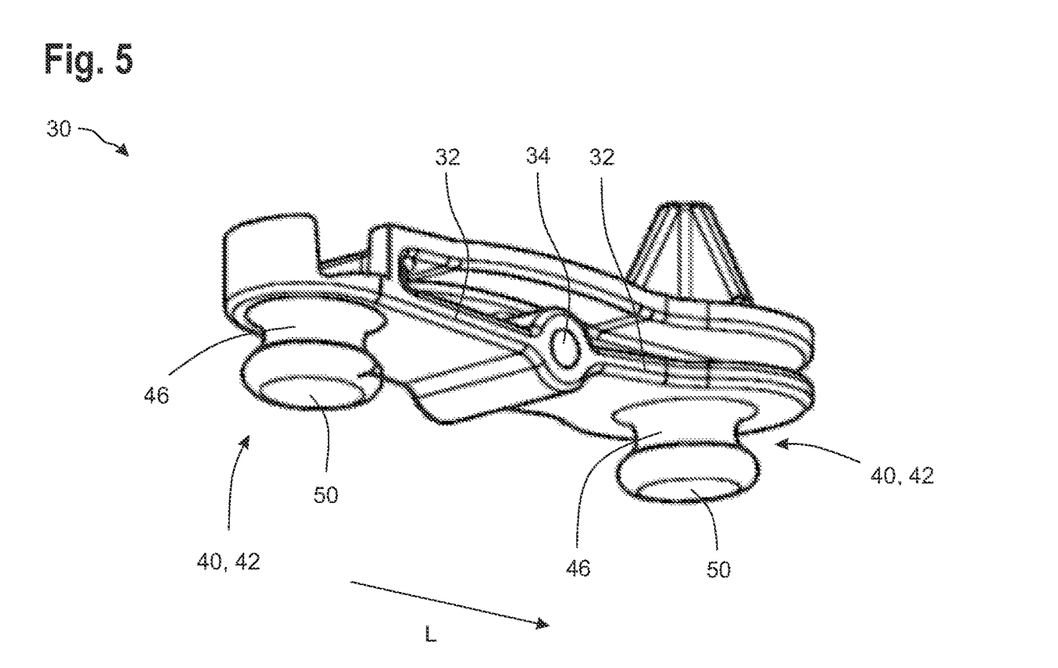
FIG. 5 shows a schematic perspective view of an actuating element of the solenoid valve of FIG. 1.

The outer contour of the first fastening structure 42 and the inner contour of the second fastening structure 44 are here substantially identical, such that the diaphragm 18 completely rests against the protrusion in the receptacle, when the diaphragm 18 is mounted (see FIG. 4, for example). To this end, in the example of FIGS. 6 to 8, the first fastening structure 42 has an inclined surface 53 at the transition to the connecting element 40, which corresponds to the insertion bevel 51 on the diaphragm 18.

The two connecting sections 40 having the first fastening structures 42 are here each assigned to one of the valve seats 26 and are correspondingly arranged in the area of the two valve seats 26.

A flat underside of the first fastening structures 42 respectively forms a contact surface 50 against which the diaphragm 18 rests and which supports the diaphragm 18 when the latter rests on the valve seat 26.

This contact surface 50 is here chosen slightly larger than the surface of the valve seat 26 such that the diaphragm 18 is supported by the first fastening structure 42 over the entire surface of the valve seat 26.

As shown in FIG. 4, the two contact surfaces 50 are inclined in opposite angles α, when the actuating element 30 is in an unloaded, symmetric position. This angle α corresponds to a maximum pivot angle of the actuating element 30 between the open position and the closed position of the respective valve seat 26 such that in the closed position for the respective valve seat 26, the contact surface 50 rests thereon in a flat manner and the entire area of the valve seat 26 is uniformly loaded.

The second fastening structures 44 on the diaphragm 18 are accordingly formed such that there is a zero-play contact on the contact surfaces 50.

Laterally to the connecting sections 40, free spaces 51 are provided in the second housing part 16 which give the diaphragm 18 a predetermined freedom of movement (see FIG. 4).

The diaphragm 18 is designed to be replaced as a wearing part.

According to a first embodiment, the two housing parts 14, 16 are connected to each other at an edge, here a narrow side, via a hinge 52. This can be seen, for example, in FIGS. 1 and 2.

To this end, hinge elements are integrally formed on both housing parts 14, 16, by means of which a hinge pin is shifted which connects the housing parts 14, 16 to each other. The housing 12 can be unfolded at the hinge 52 into the service position shown in FIG. 2, in which the interior between the two housing parts 14, 16 and thus also the diaphragm is accessible.

Figure 2:
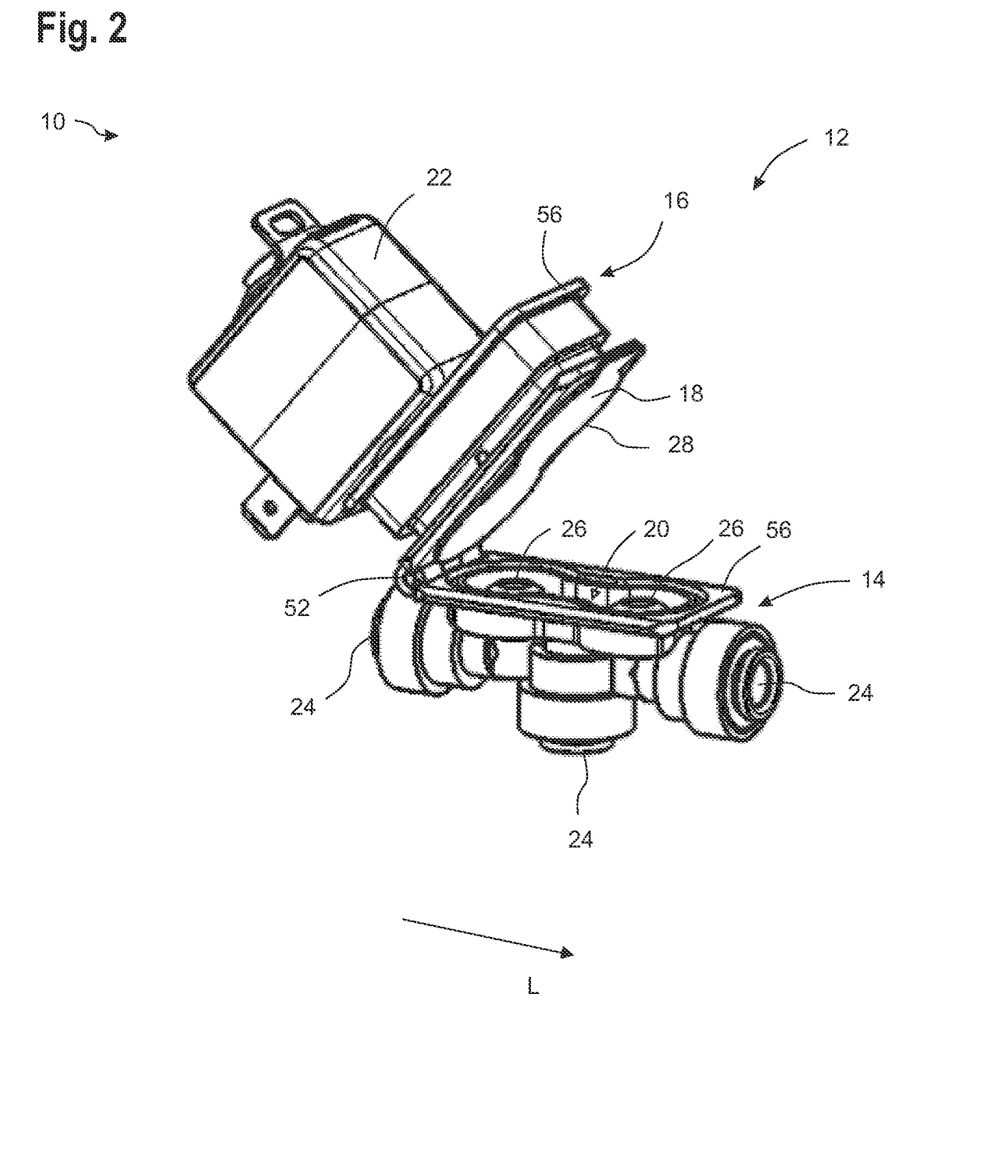
FIG. 2 shows the solenoid valve of FIG. 1 in a schematic perspective view in a service position.

If the diaphragm 18 has to be replaced, it is nondestructively withdrawn from the first fastening structures 42 of the actuating element 30 when the housing 12 is in the service position of FIG. 2. Then, a new diaphragm 18 is mounted in that the second fastening structures 44 thereof are pulled, so to speak buttoned onto the first fastening structures 42 of the actuating element 30. The second fastening structures 44 are elastically deformed, and the undercuts engage each other so that the annular projections 48 come to rest in the annular grooves 46.

When the positive fit of the diaphragm 18 with the actuating element 30 is established, the housing parts 14, 16 are again folded together into the operating position, the peripheral edge 28 of the diaphragm 18 being clamped between the two housing parts 14, 16.

Both the movement of the housing parts 14, 16 between the operating position and the service position and the replacement of the diaphragm 18 may be carried out without tools, if necessary.

An undesired opening of the housing 12 is prevented by a locking mechanism 53. The latter comprises a locking component 54 (see also FIG. 3) which fixes the two housing parts 14, 16 to each other in the operating position.

In this example, the locking component 54 is formed by a kind of clamp which is pushed in a longitudinal direction L of the housing 12 and of the actuating element 30 onto flat lateral edges of the housing parts 14, 16 which form bar structures 56. In a locked position of the locking component 54, the housing parts 14, 16 are thus held in the operating position and are prevented from moving away from each other. If the housing 12 is to be moved into the service position, the locking component 54 is first withdrawn along the longitudinal direction L before the housing parts 14, 16 are unfolded.

Figure 9:
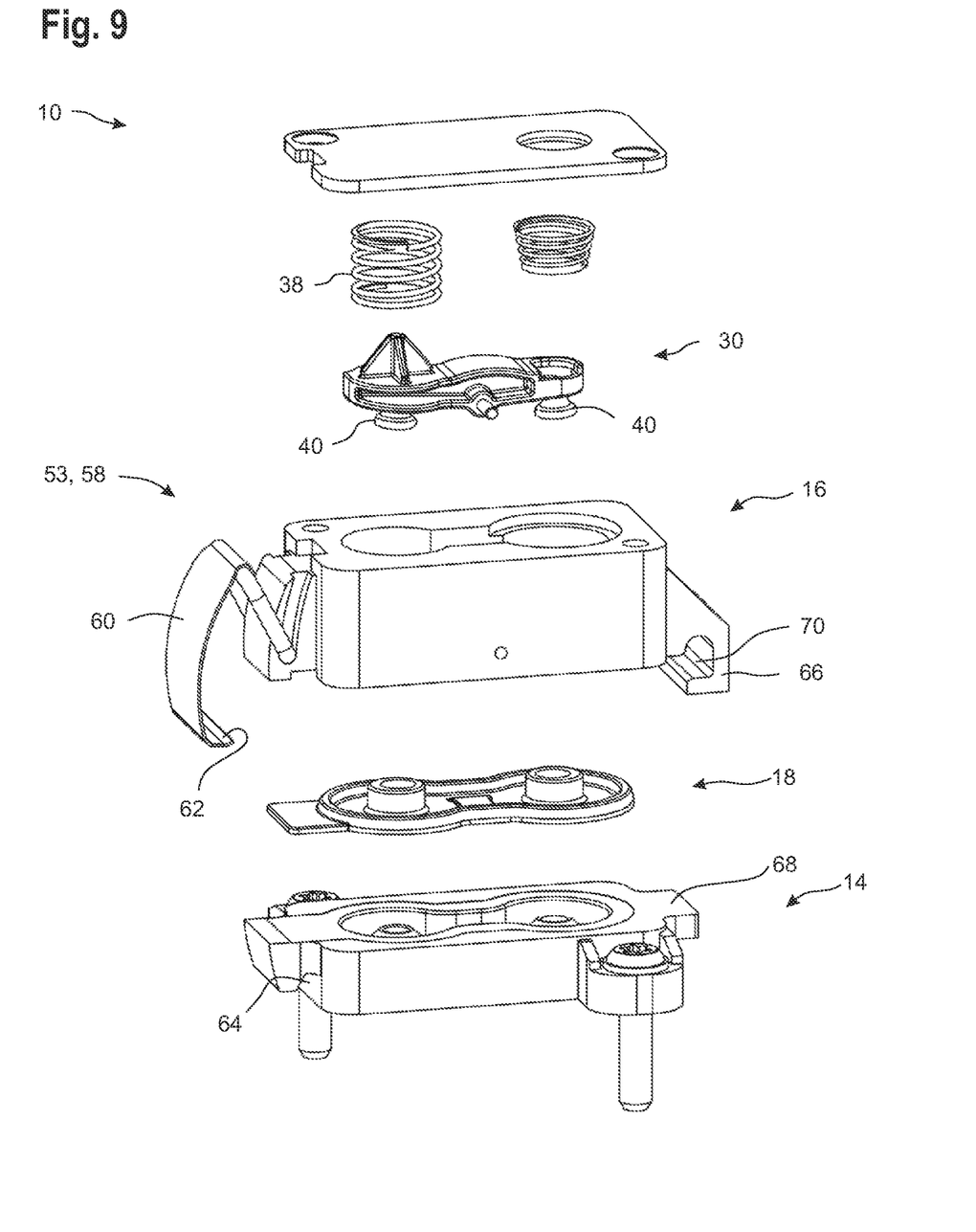
FIGS. 9 to 11 show a solenoid valve according to the invention in a second embodiment in schematic exploded views and in a sectional view.
Figure 10:
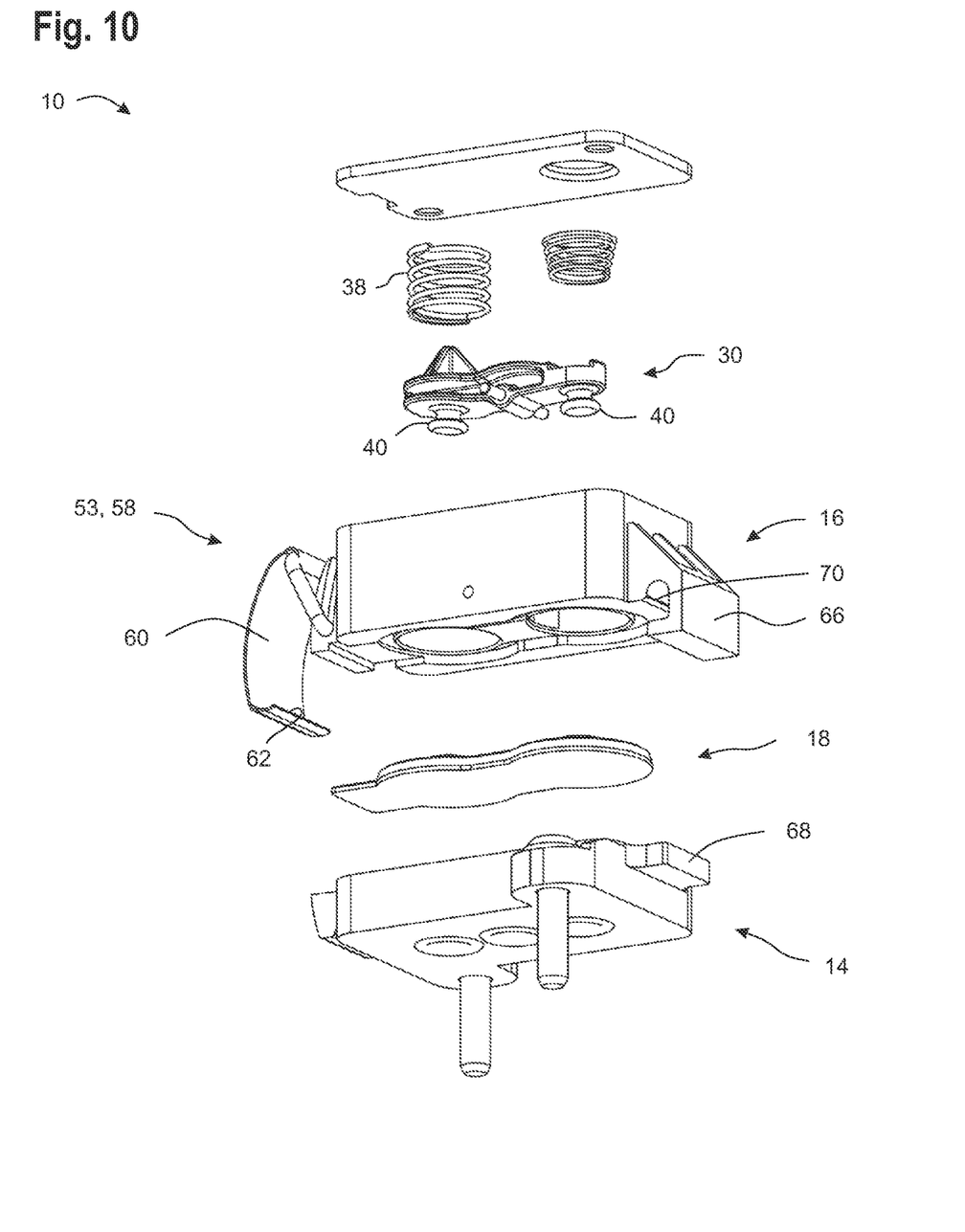
Figure 11:
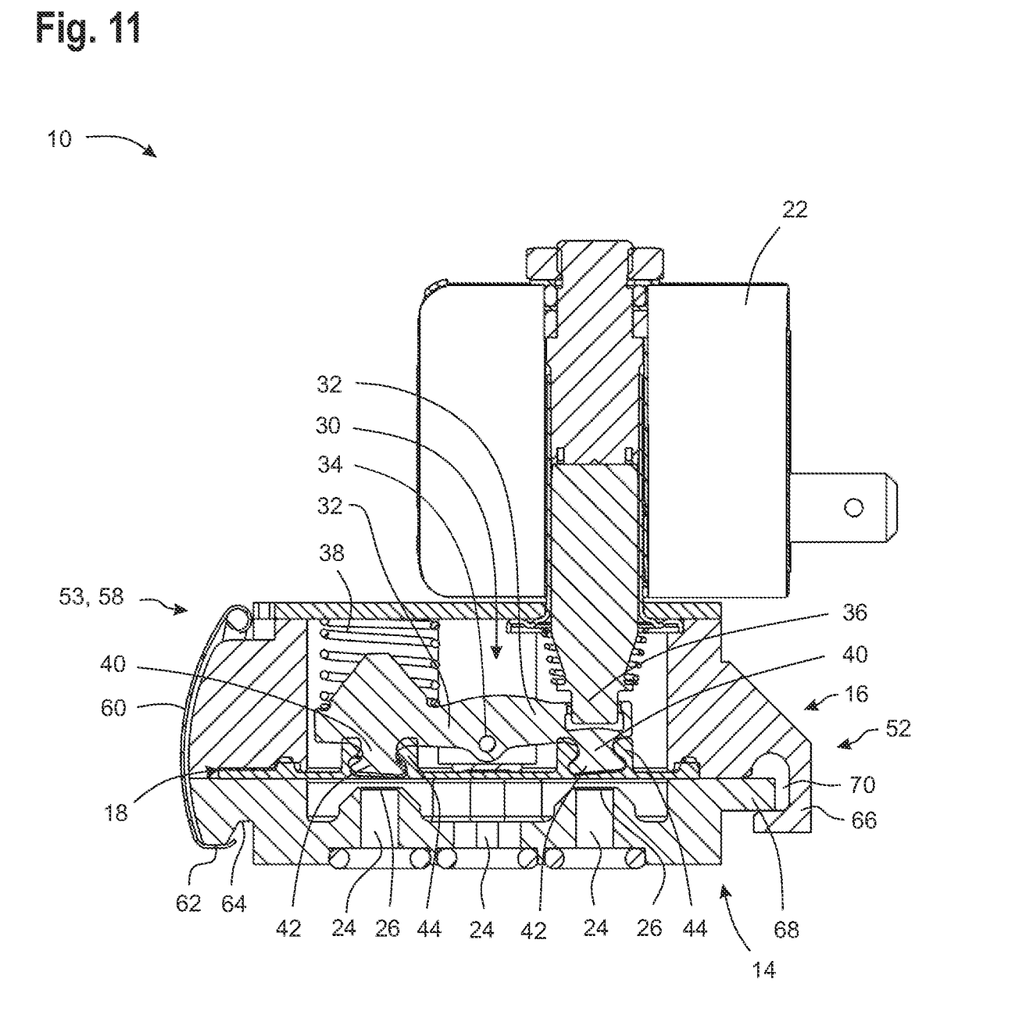

FIGS. 9 to 11 show a second embodiment of a solenoid valve 10. The essential difference to the first embodiment is the type of the locking mechanism 53.

In this example, the locking mechanism 53 comprises a clamp mechanism 58 which is provided on a narrow side of the housing 12. The clamp mechanism 58 is configured like a known clip closure and has a pivotable clip 60 which can engage in a recess 64 formed as an undercut with a contact face 62 at the free end thereof. The clip 60 thus corresponds to the locking component 54 and the contact surface 62 to the bar structure 56.

The clip 60 is here arranged on the second housing part 16, whereas the recess 64 is formed on the first housing part 14.

The locking and unlocking of the locking mechanism 53 in the form of the clamp mechanism 58 is here possible without tools, i.e. only by hand force.

A hinge 52 is provided on the narrow side of the housing 12 opposite the clamp mechanism 58, around which the housing parts 14, 16 can be pivoted when the clip 60 is detached. However, if the clamp mechanism 58 is locked and the clip 60 engages in the recess 64, the housing parts 14, 16 cannot be moved relative to each other.

In this example, the hinge 52 is formed by a hook-shaped strip 66 on the second housing part 16 and a protrusion 68 on the first housing part 14 which engages into the depression 70 formed by the strip 66.

The clip 60 and/or the strip 66 may of course also be provided on the first housing part 14.

In the variant shown in FIG. 6, a clamp mechanism 58 is respectively provided on both narrow sides of the housing 12. For unlocking, both clips 60 have to be opened and accordingly have to be closed again for locking. A hinge is not provided in this configuration.

The positive connection between the diaphragm 18 and the actuating element 30 enables, by unfolding the housing 12, the replacement of the diaphragm 18 and thus the further use of the solenoid valve 10.

The invention claimed is:

1. A solenoid valve, comprising:
   a housing which includes a first and a second housing part,
   wherein a flexible diaphragm is arranged between the first and the second housing part,
   wherein at least one fluid duct having a valve seat adapted to be closed by the diaphragm is formed in the first housing part, and a movably mounted actuating element is received in the second housing part, which is connected to the diaphragm and detaches the diaphragm from the valve seat in an operating position of the first and of the second housing part upon movement into an open position, and which presses the diaphragm onto the valve seat upon movement into a closed position,
   wherein the housing is formed such that the first and the second housing part can take up a service position in which the first and the second housing part are spaced apart from each other and in which the diaphragm is accessible,
   wherein the diaphragm is connected to the actuating element in a nondestructively detachable manner and the diaphragm and the actuating element are formed such that in the service position, the diaphragm can be removed from the actuating element and can be connected thereto, and
   wherein the first and second housing parts are configured to be detached from each other and to be moved into the service position without tools, and the diaphragm is configured for a replacement without tools.

2. The solenoid valve according to claim 1, wherein at least one connecting section is provided on the actuating element and has a first fastening structure which is adapted to be connected with a positive fit to a complementary second fastening structure on the diaphragm.

3. The solenoid valve according to claim 2, wherein one of the fastening structures is configured as a protrusion and the other fastening structure is configured as a receptacle which is complementary to the protrusion.

4. The solenoid valve according to claim 3, wherein both fastening structures are provided with complementary undercuts which engage each other when the diaphragm is mounted on the actuating element.

5. The solenoid valve according to claim 4, wherein the undercut of the protrusion has a volume (V1) which in comparison with the volume (V2) of the radially projecting free end of the protrusion which forms a thickening is in the range of 1 to 1,6 as measured from the narrowest point.

6. The solenoid valve according to claim 2, wherein an insertion bevel for the first fastening structure is formed on the diaphragm on the second fastening structure.

7. The solenoid valve according to claim 2, wherein at least one fastening structure is arranged in the area of the valve seat.

8. The solenoid valve according to claim 7, wherein the at least one fastening structure is oriented concentrically to the valve seat when the valve seat is closed.

9. The solenoid valve according to claim 1, wherein the diaphragm is directly connected to the actuating element via a latching connection.

10. The solenoid valve according to claim 1, wherein a locking mechanism is provided, wherein in a locked position, the locking mechanism prevents the housing from being moveable into the service position.

11. The solenoid valve according to claim 10, wherein the locking mechanism comprises at least one locking component cooperating with a bar structure on the first and/or on the second housing part.

12. The solenoid valve according to claim 10, wherein the locking mechanism is a clamp mechanism.

13. The solenoid valve according to claim 12, wherein the locking mechanism comprises a pivotable clip.

14. The solenoid valve according to claim 1, wherein the actuating element is configured as a rocker having two arms.

15. The solenoid valve according to claim 14, wherein two adjacent valve seats are provided along a longitudinal direction (L) of the actuating element.

16. The solenoid valve according to claim 15, wherein the two arms of the rocker are each connected to the diaphragm.

17. An assembly, comprising:
a solenoid valve having a housing which includes a first and a second housing part, wherein a flexible diaphragm is arranged between the first and the second housing part, wherein at least one fluid duct having a valve seat adapted to be closed by the diaphragm is formed in the first housing part, and a movably mounted actuating element is received in the second housing part, which is connected to the diaphragm and detaches the diaphragm from the valve seat in an operating position of the first and of the second housing part upon movement into an open position, and which presses the diaphragm onto the valve seat upon movement into a closed position, wherein the housing is formed such that the first and the second housing part can take up a service position in which the first and the second housing part are spaced apart from each other and in which the diaphragm is accessible, and wherein the diaphragm is connected to the actuating element in a nondestructively detachable manner and the diaphragm and the actuating element are formed such that in the service position, the diaphragm can be removed from the actuating element and can be connected thereto, and
a diaphragm which is adapted to be connected with a positive fit to the actuating element
wherein the first and second housing parts are configured to be detached from each other and to be moved into the service position without tools, and the diaphragm is configured for a replacement without tools.

18. A method of replacing a diaphragm of a solenoid valve having a housing which comprises a first and a second housing part, wherein a flexible diaphragm is arranged between the first and the second housing part, wherein at least one fluid duct having a valve seat adapted to be closed by the diaphragm is formed in the first housing part, and a movably mounted actuating element is received in the second housing part, which is connected to the diaphragm and detaches the diaphragm from the valve seat in an operating position of the first and of the second housing part upon movement into an open position, and which presses the diaphragm onto the valve seat upon movement into a closed position, wherein the housing is formed such that the first and the second housing part can take up a service position in which the first and the second housing part are spaced apart from each other and in which the diaphragm is accessible, wherein the housing parts are detached from each other without tools and wherein the diaphragm is connected to the actuating element in a nondestructively detachable manner and the diaphragm and the actuating element are formed such that in the service position, the diaphragm can be removed from the actuating element and can be connected thereto,
the method comprising:
moving the first and second housing parts from the operating position into the service position without tools,
removing the diaphragm mounted on the actuating element from the actuating element in that a positive fit between the diaphragm and the actuating element is released,
fixing a new diaphragm to be mounted to the actuating element in that a positive fit is produced between the diaphragm and the actuating element, and
moving the first and second housing parts from the service position back to the operating position.

* * * * *